Patented Nov. 18, 1930

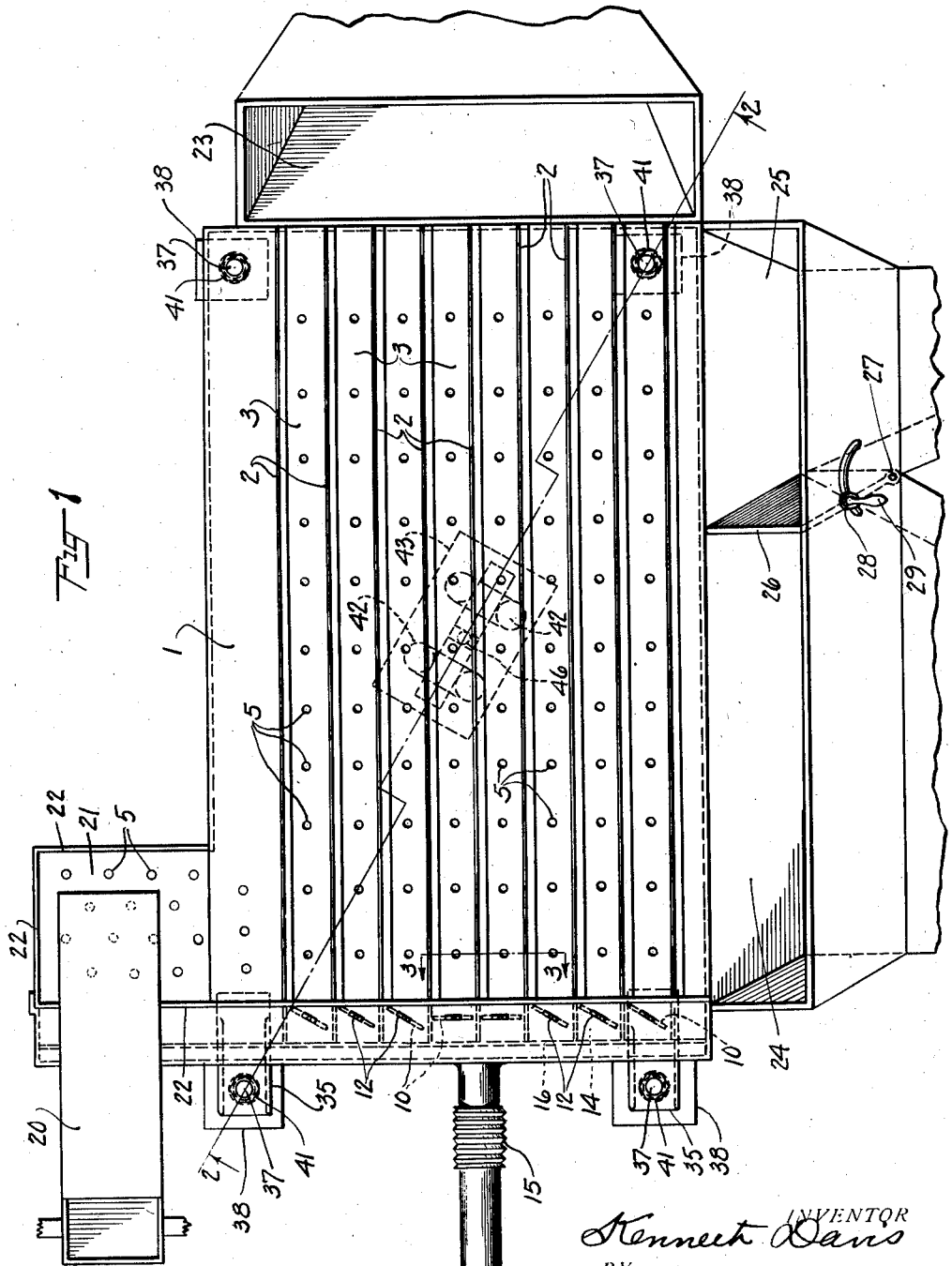

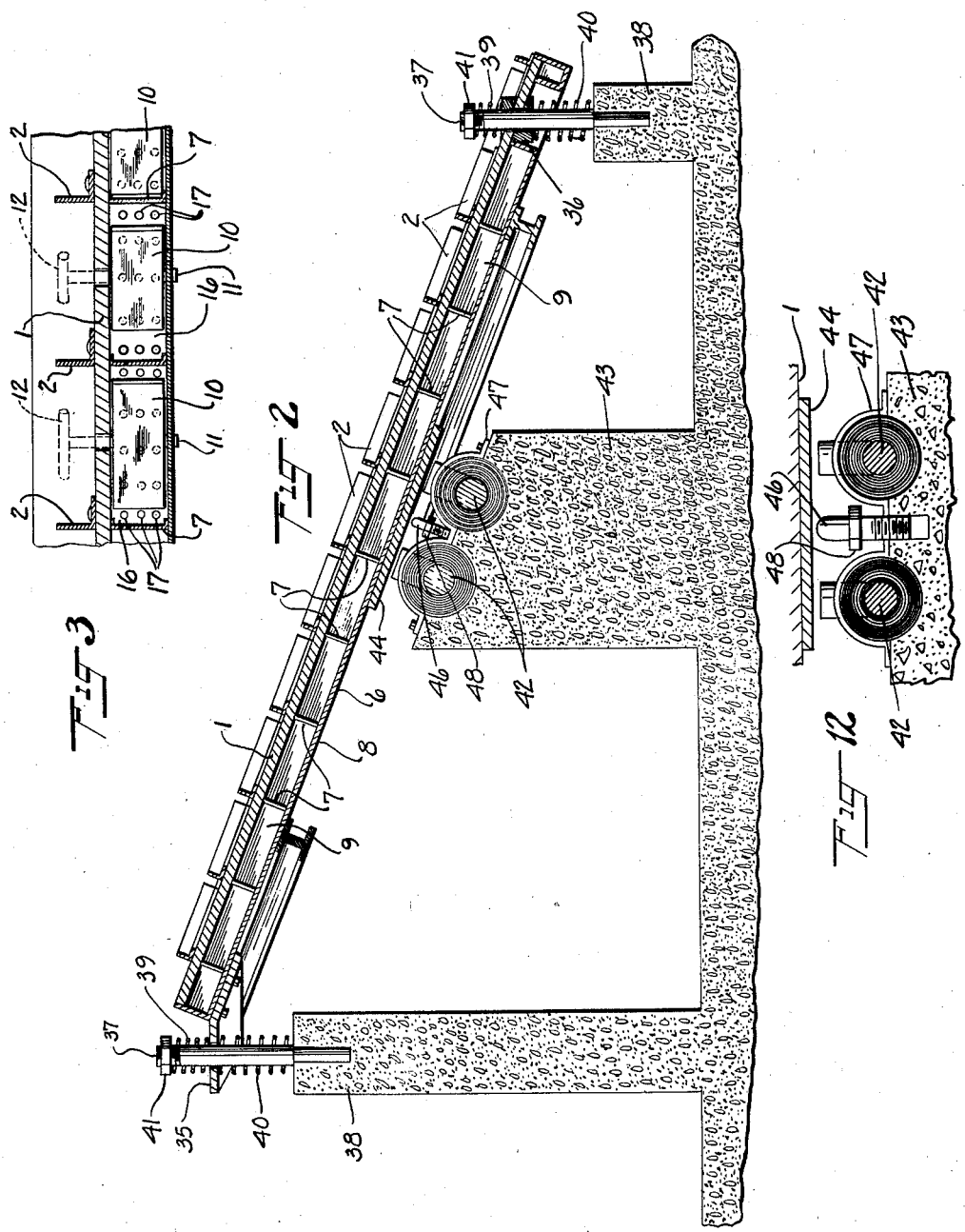

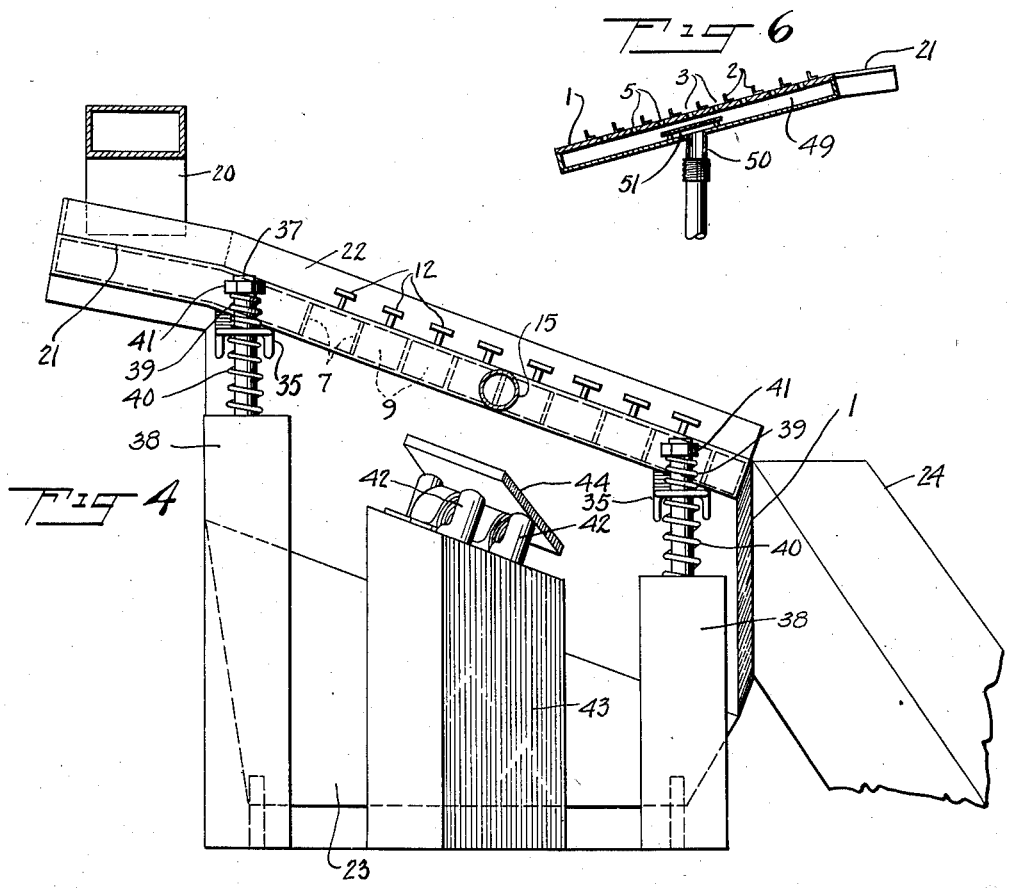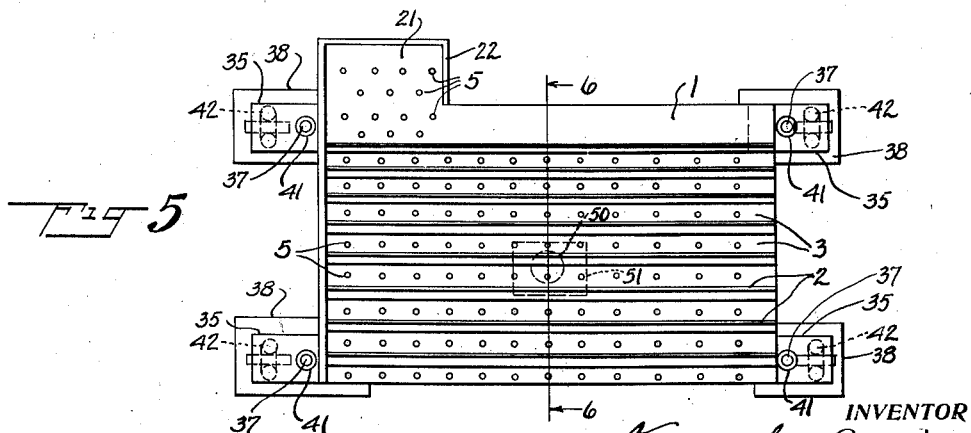

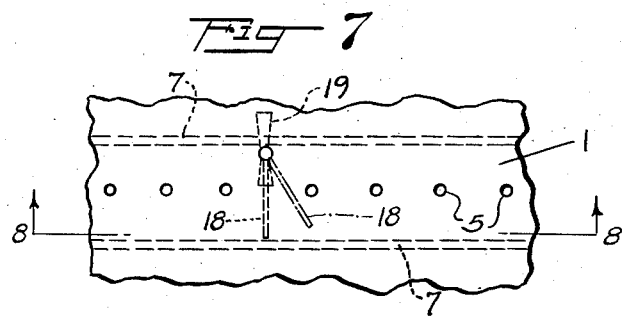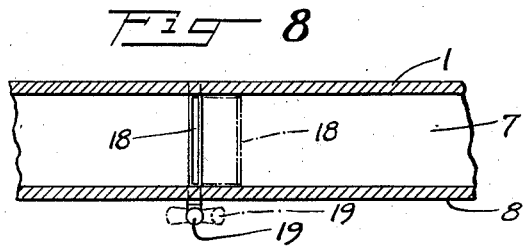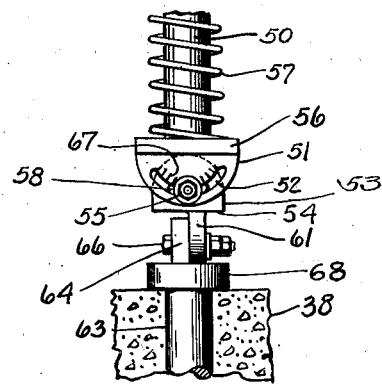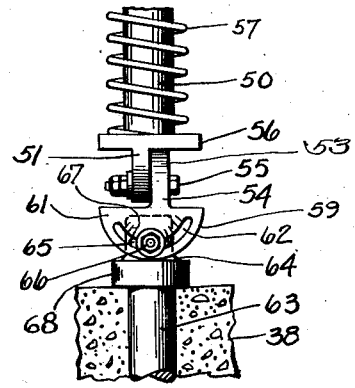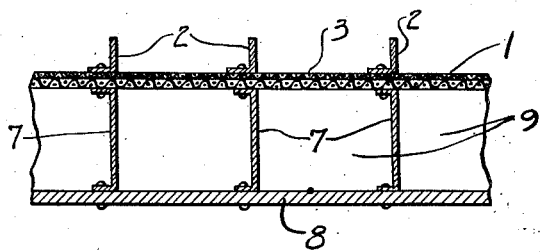

1,782,391

UNITED STATES PATENT OFFICE

KENNETH DAVIS, OF EBENSBURG, PENNSYLVANIA, ASSIGNOR, BY MESNE ASSIGN-MENTS, TO PEALE-DAVIS COMPANY, OF WILMINGTON, DELAWARE, A CORPORATION OF DELAWARE

PROCESS AND MECHANISM FOR SEPARATING INTERMIXED MATERIALS

Application filed January 31, 1922, Serial No. 532,978. Renewed December 20, 1928.

The invention relates to a novel mechanism and method for separating two or more divided and intermixed loose materials, and more particularly and in detail to a novel mechanism and method for so separating said materials by the coaction of gravity and the difference in specific gravity of the intermixed materials with the employment of air under pressure in connection with a vibrating table.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel steps, processes, parts, constructions and arrangements herein shown and described.

The accompanying drawings, herein referred to and constituting a part hereof, illustrate the present preferred embodiment of the invention and manner of practicing the process, the same serving in connection with the description to illustrate and explain the principles of the invention.

Of the drawings:—

Fig. 1 is a top plan of a mechanism constructed in accordance with the invention;

Fig. 2 is a vertical section taken on the line 2—2 of Fig. 1;

Fig. 3 is a detail vertical section, on an enlarged scale, on the line 3—3 of Fig. 1;

Fig. 4 is an elevation looking at Fig. 1 from the left;

Fig. 5 is a top plan similar to Fig. 1, but showing a different form of table with a different form of air supply;

Fig. 6 is a transverse section on line 6—6 of Fig. 5;

Fig. 7 is a fragmentary, detail top plan, on an enlarged scale of the table, showing one of the devices for regulating the air supply along the compartments of the air chamber;

Fig. 8 is a vertical section, taken on line 8—8 of Fig. 7;

Figs. 9 and 10 are detached details of the variably positionable supports for the table;

Fig. 11 is a fragmentary detail of a form of the air pervious table; and

Fig. 12 is an enlarged fragmentary view of the central part of Fig. 2.

The invention is directed to a process and mechanism for rapidly, expeditiously and completely separating intermixed divided materials. The term "divided" signifies materials which are in relatively small parts or particles as differentiated from material in relatively large masses, and the material may be broken, granular, pulverulent or otherwise conditioned or prepared.

An example of material to be operated on is an intermixture of coal, rock and "bone", a combustible material with a high ash content. The material is separated by the combined action of gravity and the specific gravity of the material, the material being preferably and usually "sized", that is, sorted so that the parts or particles are approximately of uniform size.

By the present invention, a table having longitudinally disposed riffles is inclined so that the riffles are downwardly disposed toward the discharge end and so that there is a fairly or relatively strong slant of the table across the riffles, and the table is vibrated, preferably more or less perpendicularly to its plane, and the material of least or lesser specific gravity is at the same time floated by air under pressure, the vibration and air action effecting a travel of the lighter particles across the riffles, while the heavier particles are impelled along the riffles.

The double inclination of the table will cause gravity to act on the lighter and heavier particles and impel them more rapidly and definitely in their respective separate paths under the impulsion or action of the separating agencies, such as the air and vibration. By controlling the direction of the vibration, and if desired, also its intensity, the rate of movement and also the direction of travel of the separated particles and materials may be controlled and relatively varied so as to effect a very clean, or complete, and also a very rapid separation of the intermixed materials.

The foregoing general statement and also the following detailed description it will be understood are exemplary and explanatory of the invention, but are not restrictive thereof, and various further features of the invention will be set forth in connection with the detailed description.

Referring now in detail to the present preferred embodiment of the invention a table or support 1 is provided, which is preferably plane or substantially plane and which is inclined, preferably relatively sharply, both transversely and longitudinally, as will best appear from a comparison of Figs. 2 and 4, the materials to be separated being received at or near the highest corner (which would be the left hand corner in Fig. 1) the materials gradually progressing downwardly to the right and to the bottom of Fig. 1, the completely separated materials leaving the table at different places along its right hand and lower edges in said figure.

The table 1 is provided with what may be conveniently termed material-containing or material-directing depressions or means. These are not necessarily structural depressions in the table, and as here embodied, there is provided on the surface of the table 1 a plurality of riffles 2, which are preferably plates projecting upwardly from, and attached to, the surface of the table, as will be clear from Fig. 3. The table structure is shown somewhat conventionally in Figs. 1 and 3, as in practice usually the table will be constructed as shown in Fig. 11, although the structure may be varied as desired.

The riffles 2 are disposed longitudinally, side by side, and are preferably, though not necessarily, parallel to each other, and may be parallel to the sides of the table itself, and are so shown in Fig. 1. The height of the riffles may be varied and they may be spaced apart different distances, as may be found advisable and most efficient by experience with different materials and with materials in different conditions.

In accordance with one feature of the invention, air pressure is also employed in the separating action, and preferably the separation of the intermixed materials is effected by the combined flotation of the lighter materials by the air pressure in connection with a vibratory motion of the table or support acting to throw the lighter particles across the riffles from one depression to another, and the heavier particles along between the riffles. As at present embodied, and referring now particularly to the air pressure means, the surface of the table 1 is provided with a plurality of perforations 5, preferably disposed along the depressions or spaces 3 between the riffles 2. These perforations 5 open into an air chamber 6 beneath the table 1, which chamber is supplied with air under pressure. A layer or layers of fabric or wire mesh, or other material may be employed in the usual manner to keep the material from dropping into the perforations, or the table may be constructed as shown in Fig. 11, or otherwise as may be convenient or desirable.

In accordance with one feature of the invention, means are provided for controlling as desired the action of the air at the different parts of the table. As embodied, the air chamber 6 is divided in a plurality of compartments by partitions 7, extending upwardly from the floor 8 of the air chamber to the bottom side of the table 1. These partitions as shown, and as at present preferred, extend beneath the riffles 2.

Means are provided for admitting and closing off and regulating the flow of the air into the respective chambers 9. As embodied, at one end of the table 1, which may be termed the air supply end, each of the chambers 9 is provided with a damper or valve 10, fixed on a pin 11, which is pivotally mounted in the bottom 8 of the air chamber and in the support 1, projecting upwardly therethrough, and at its upper end the pin is provided with a hand piece 12, for turning the valve 10 and for indicating the position thereof. Extending across the end of the table is a chamber 14 with which the various chambers 9 communicate through a perforate plate or bulkhead 16, having perforations 17 therethrough. The chamber 14 is provided with a suitable air pressure supply, such as a flexible pipe 15, which communicates with a fan or bellows, or other source of constant or intermittent or variable air pressure.

The action of the air along the tables, that is longitudinally of the chamber 9, may be regulated in suitable manner, and for this purpose there are shown (Figs. 7 and 8) dampers 18 mounted at different points along the chambers 9, which may be used to reduce or cut off the supply of air to the parts of the chamber 9 beyond the damper or dampers. These may vary in number and position as may be found most efficient or desirable in any particular installation, or in operating upon any particular kind of materials or upon materials in different physical conditions. Dampers 18 have handles 19 projecting through the bottom of the air chamber to operate the dampers and also to indicate their position.

Any suitable means for supplying the materials to be separated may be employed, and a chute 20 is shown conventionally, adapted to supply the intermixed materials gradually and continuously to the receiving table 21, which may have a retaining rim 22 thereabout, which may extend across the entire length of the left hand end of the table, as shown in Fig. 1.

In the embodied form of delivery means, or means for receiving the separated materials, a receiving chute 23 for the heaviest separated material is shown at the right-hand end in Fig. 1, and chutes 24 and 25 at he bottom of Fig. 1 for the lightest and intermediate materials. An adjustable or variably positionable plate 26 is provided which may be moved along the table and positioned at the exact point of separation between two of the materials. For this purpose the plate 26 is pivoted at 27, and is shown with a hand-piece 29 and a locking nut 28. The chutes themselves may also be positionable along the table as may be desired.

The table vibrating means may be constructed to vibrate perpendicularly to the plane of the table or to have a component perpendicularly to the plane of the table and to have one or more components directed optionally along the riffles or at any angle across the riffles to correspond in any desired degree with the direction desired to be given to either one or other of the intermixed materials. That is, the air pressure will operate or participate only in the passage of the lightest or lighter materials across the riffles, while the vibratory motion of the table may be regulated and directed in force, amplitude and direction to affect or control the direction taken by the various intermixed materials in the process of separation.

As embodied, the table 1 together with its air chamber are resiliently mounted, and as shown plates 35 are provided at some of the corners, and blocks 36 at other corners, fixed to the table, these being apertured respectively to receive the corresponding posts 37, which are set in suitable supports 38. Springs 40 are coiled about the posts 37 in compression between the plates 35 or block 36 and the supports 38. In Fig. 2 the springs are shown double. Springs 39 are mounted to operate against springs 40 and are provided with tension regulating nuts 41. Thus the resilient motion of the table is controlled in both directions and the relative tension of the springs and the pull of the magnet may be controlled as desired.

The vibrating means, as here embodied, comprise electro-magnets 42 mounted on a support 43 at the center of the table 1, their poles acting upon a plate 44 attached to the bottom of the air chamber 6. The magnets may be for alternating current, the pulsations of the current serving to give the vibratory motion to the table, or they may be direct electro-magnets and may be provided with interrupters or any other suitable form of current controlling mechanism.

Means are provided for preventing impact between the magnet poles and the armature and for regulating, or for assisting the spring adjustment in regulating, amplitude of vibration of the table. As embodied, a pin, or plurality of pins 46, are screw-threaded into the magnet base plate or frame 47, and are provided with a head 48 for turning by a wrench or spanner. The head of the pin is preferably rounded.

Means are provided for varying the directional components of the vibrational movement of the table, and as embodied the table supports are variably or adjustably directionally positionable, so as to cause the table to vibrate perpendicularly to its own plane or in various desired directions at more or less of an angle thereto. Thus the direction of vibration may be to a greater or lesser extent along the riffles or to a greater or less extent across them, as may be found desirable or efficacious in separating particular intermixed materials or such materials in a particular physical state.

As embodies (Figs. 9 and 10) pins 50 (corresponding to pins 37) have flat bases 51 provided with arcuate slots 52. These bases contact with a like part 53 of a member 54, the part 53 having a corresponding slot 58. A clamping bolt 55 passes through the slots and clamps the two parts 51 and 53 together at any desired angle. Pins 50 have collars 56, seating springs 57 (corresponding to springs 40).

The members 54 have each downwardly projecting flat parts 61 having arcuate slots 62. Pins 63, adapted to be set in a concrete foundation or other suitable support, have flat parts 64 contacting with the parts 61, and having corresponding arcuate slots 65. Bolts 66 pass through these slots and clamp the parts 61 and 64 together at a desired angle. The parts may have scale indications 67 so that the various posts may all be uniformly inclined. This affords a universal positioning means whereby the direction of vibration of the table may be varied as desired. It may be found desirable with this mounting to use only one of the pins 46 at the center of the armature. Collars 56 rest, respectively, on pieces 59, and the pieces 59 rest on collars 68 formed on the pins 63, so that the weight of the table is not carried on the bolts. When the angle of the table is shifted as described, the electro-magnets remain fixed; the angular pull of the magnets on the table is thus variable, and thus the horizontal and vertical components of such pull may be varied.

In Figs. 5 and 6 of the drawings a modified form of air chamber is shown, the chamber 49 having an air pipe 50 opening into the central part thereof and provided with a baffle plate 51 to distribute and equalize the air pressure. The application of this structure to the other features of the invention will be clear without further detailed description.

In Fig. 5 the electromagnets for vibrating the table are placed at the corners thereof.

Fig. 11 shows the table 1 composed of two plies of wire mesh, a fine mesh above and a heavier supporting mesh below. The details of structure of the air pervious table may be varied as desired.

The invention in its broader aspects is not limited to the specific mechanisms shown and described but departures may be made therefrom within the scope of the accompanying claims without departing from the principles of the invention and without sacrificing its chief advantages.

What I claim is:—

1. A mechanism for separating intermixed divided materials, comprising in combination an air pervious table having longitudinally extending partitions thereon, means for supporting the table in a diagonally inclined position so that the materials tend to travel across the partitions, said supporting means including resilient means, carrying the weight of the table, for resiliently supporting it, means for forcing air through the table, and means for vibrating the table in a direction substantially perpendicular thereto.

2. A mechanism for separating intermixed divided materials, comprising in combination an air pervious table having longitudinally extending partitions thereon, means for supporting the table in a diagonally inclined position so that the materials tend to travel across the partitions, said supporting means including resilient means, carrying the weight of the table, for resiliently supporting it, resilient means above the table for yieldably resisting upward movement thereof, means for forcing air through the table, and means for vibrating the table in a direction substantially perpendicular thereto.

3. A mechanism for separating intermixed divided materials, comprising in combination an air pervious table having longitudinally extending partitions thereon, means for supporting the table in a diagonally inclined position so that the materials tend to travel across the partitions, said supporting means including resilient means, carrying the weight of the table, for resiliently supporting it, means for forcing air through the table, in variable volume in different parts thereof, and means for vibrating the table in a direction substantially perpendicular thereto.

4. A mechanism for separating intermixed divided materials, comprising in combination an air pervious table having longitudinally extending partitions thereon, means for supporting the table in a diagonally inclined position so that the materials tend to travel across the partitions, said supporting means including resilient means, carrying the weight of the table, for resiliently supporting it, means for forcing air through the table, and electromagnetic means for vibrating the table in a direction substantially perpendicular thereto.

5. A mechanism for separating intermixed divided materials, comprising in combination an inclined air pervious table having longitudinally extending partitions thereon, means, including resilient devices carrying the weight of the table, for resiliently supporting it, said means being variably positionable for varying the angle of inclination of the table, means for forcing air through the table in variable volume in different parts of the table and means for vibrating the table in a direction substantially perpendicular thereto.

6. A mechanism for separating intermixed divided materials, comprising in combination an air pervious table having longitudinally extending partitions thereon, means for supporting the table in a diagonally inclined position so that the materials tend to travel across the partitions, said supporting means including resilient means, carrying the weight of the table, for resiliently supporting it, means for forcing air through the table in variable volume in different parts of the table, including a plurality of air chambers below the table and valves for controlling the flow of air to the individual chambers, and means for vibrating the table in a direction substantially perpendicular thereto.

7. Mechanism for separating intermixed divided materials, comprising in combination an air pervious table, provided with longitudinally extending riffles, the table being inclined so that the materials tend to flow across the riffles, means for forcing air through the table in variable volume in different parts of the table, including a plurality of air chambers below the table, and a corresponding plurality of valves for the respective chambers, and means for vibrating the table in a direction substantially perpendicular thereto.

8. A mechanism for separating intermixed, divided materials including in combination an air-pervious table, means for maintaining thereon a bed of materials extending substantially continuously thereover, means for progressively stratifying the materials in superposed strata according to their specific gravities and for progressing the settled heavier materials and a continuous, flotant, superior stratum of lighter material to separate places of discharge including devices for vibrating the table, separating partitions for directing the settled heavier material transversely of the direction of flow of the flotant lighter material, and mechanism for passing lifting air currents upwardly through the table and the bed of materials thereon, said air supply mechanism comprising a plurality of individual chambers underlying the table, said individual chambers extending along the separating partitions, means for independently regulating the supply of air to each individual chamber and means for further controlling the air supply along the separating partitions.

9. A mechanism for separating intermixed, divided materials including in combination an air-pervious table, means for maintaining thereon a bed of materials extending substantially continuously thereover, means for progressively stratifying the materials in superposed strata according to their specific gravities and for progressing the settled heavier material and a continuous, flotant, superior stratum of lighter material to separate places of discharge including devices for vibrating the table, separating partitions for directing the settled heavier material transversely of the direction of flow of the flotant lighter material, and mechanism for passing lifting air currents upwardly through the table and the bed of materials thereon, means for controlling the amount of air supplied to different areal divisions of the table both laterally and longitudinally thereof including a plurality of individual chambers underlying the table and means for independently regulating the air supply to each chamber.

10. A mechanism for separating intermixed, divided materials including in combination an air-pervious table, means for maintaining thereon a bed of materials extending substantially continuously thereover, means for progressively stratifying the materials in superposed strata according to their specific gravities and for progressing the settled heavier material and a continuous, flotant, superior stratum of lighter material to separate places of discharge including devices for vibrating the table, separating partitions for directing the settled heavier material transversely of the direction of flow of the flotant lighter material, and mechanism for passing lifting air currents upwardly through the table and the bed of materials thereon, means for controlling the amount of air supplied to different areal divisions of the table both laterally and longitudinally thereof including a plurality of individual chambers underlying the table and extending substantially parallel to the separating partitions.

11. A mechanism for separating intermixed, divided materials including in combination an air-pervious table, means for maintaining thereon a bed of materials extending substantially continuously thereover, means for progressively stratifying the materials in superposed strata according to their specific gravities and for progressing the settled heavier material and a continuous, flotant, superior stratum of lighter material to separate places of discharge including devices for vibrating the table, separating partitions for directing the settled heavier material transversely of the direction of flow of the flotant lighter material, and mechanism for passing lifting air currents upwardly through the table and the bed of materials thereon, means for controlling the amount of air supplied to different areal divisions of the table both laterally and longitudinally thereof including a plurality of individual chambers underlying the table and extending substantially parallel to the separating partitions, said regulating means including devices for regulating the air supply along the partitions so as to admit different amounts of air at different parts of the separating partitions.

12. The process of separating intermixed divided materials which comprises maintaining a bed of materials in continuous progression along an air-pervious table, subjecting the materials to vibration and upwardly-directed, lifting air currents to stratify the materials according to their specific gravities, impelling a settled heavier material to discharge and permitting a flotant stratum of lighter material to progress unrestrictedly to discharge transversely of the settled heavier material, and regulating the air supplied to the bed of materials in independently controlled areas both laterally and longitudinally of the table.

13. The process of separating intermixed divided materials which comprises maintaining a bed of materials in continuous progression along an air-pervious table, subjecting the materials to vibration and upwardly-directed, lifting air currents to stratify the materials according to their specific gravities, impelling a settled heavier material to discharge and permitting a flotant stratum of lighter material to progress unrestrictedly to discharge transversely of the settled heavier material, maintaining a main supply of air under steady pressure for the entire table, and flexibly and substantially independently controlling the admission of air from said main supply to relatively small areal subdivisions of the table disposed both transversely and longitudinally thereof.

14. A mechanism for separating intermixed, divided materials including in combination an air-pervious table, means for maintaining thereon a bed of materials extending substantially continuously thereover, means for progressively stratifying the materials in superposed strata according to their specific gravities and for progressing the settled heavier material and a continuous, flotant superior stratum of lighter material to separate places of discharge including devices for vibrating the table, separating partitions solely on the surface of the table for directing the settled heavier material transversely of the direction of flow of the flotant lighter material, and mechanism for passing lifting air currents upwardly through the table and the bed of materials thereon, said air supply mechanism comprising a main air chamber under steady air pressure connected to the table and means for substantially independently controlling the supply of air from the main chamber to different areal sub-divisions of the table located at different places both longitudinally and laterally of the table.

15. In a mechanism for separating intermixed, divided materials in combination an air-pervious deck, a vibratable sub-deck, a plurality of members for supporting the deck upon the sub-deck and for dividing the space between the deck and the sub-deck into a plurality of chambers disposed both laterally and longitudinally of the air-pervious deck, a source of air under pressure, and means for individually controlling the supply of air from the source to each of said chambers.

16. The process of separating intermixed divided materials which comprises maintaining a bed of the materials in substantially continuous progression along an air-pervious table, subjecting the bed to mechanical vibration and upwardly-directed, lifting air currents to stratify the materials, progressing settled heavier material and superposed lighter material to different places of discharge, maintaining a steady supply of air under pressure for the air-pervious table, and regulating the admission of air from said supply to relatively small areas of the table located at different places longitudinally and laterally thereof.

In testimony whereof, I have signed my name to this specification.

KENNETH DAVIS.